United States Patent [19]
Ikeya et al.

[11] Patent Number: 5,482,313
[45] Date of Patent: Jan. 9, 1996

[54] PASSIVE RESTRAINT SYSTEM FOR A VEHICLE OCCUPANT USING AN AIR BAG

[75] Inventors: Akihiro Ikeya; Minoru Kanda; Toshiya Sakai, all of Saitama, Japan

[73] Assignee: Honda Giken Kogyo Kabushiki Kaisha, Tokyo, Japan

[21] Appl. No.: 322,571

[22] Filed: Oct. 13, 1994

[30] Foreign Application Priority Data

| Oct. 19, 1993 | [JP] | Japan | 5-286103 |
| Oct. 22, 1993 | [JP] | Japan | 5-287547 |
| Oct. 25, 1993 | [JP] | Japan | 5-289955 |

[51] Int. Cl.[6] ........................ B60R 21/16
[52] U.S. Cl. ............... 280/728.2; 280/728.3; 280/732
[58] Field of Search .......... 280/728 R, 728 A, 280/728 B, 731, 732, 728.1, 728.2, 728.3

[56] References Cited

U.S. PATENT DOCUMENTS

| 5,145,207 | 9/1992 | Bederka et al. | 280/728 A |
| 5,275,432 | 1/1994 | Pray et al. | 280/728 B |
| 5,326,131 | 7/1994 | Yokota et al. | 280/728 A |
| 5,326,132 | 7/1994 | Musiol et al. | 280/732 |

FOREIGN PATENT DOCUMENTS

| 62-198547 | 9/1987 | Japan . |
| 5000648 | 1/1993 | Japan | 280/728 A |

Primary Examiner—Margaret A. Focarino
Assistant Examiner—Paul N. Dickson
Attorney, Agent, or Firm—Armstrong, Westerman, Hattori, McLeland & Naughton

[57] ABSTRACT

In a passive restraint system for a vehicle occupant using an inflatable air bag, an open base end of the air bag is clamped between an air bag housing for accommodating the air bag in its folded state and an inflator housing for receiving an inflator for producing the inflating gas therein. Thus, the base end of the air bag can be attached securely and tightly to the air bag system in a highly simple manner. The air bag housing diverges toward the opening for deploying the air bag, and the air bag can be therefore rapidly deployed without encountering any substantial resistance from the air bag housing. Also, the diverging shape of the air bag housing allows the air bag housing to be laterally deformed to absorb the energy of impact applied thereto.

18 Claims, 8 Drawing Sheets

PASSIVE RESTRAINT SYSTEM FOR A VEHICLE OCCUPANT USING AN AIR BAG

TECHNICAL FIELD

The present invention relates to a passive restraint system for protecting a vehicle occupant from the impact of a vehicle crash by using an inflatable air bag.

BACKGROUND OF THE INVENTION

An increasingly large number of automobiles are equipped with a passive restraint system which employs an inflatable air bag in case of a vehicle crash by detecting a large deceleration of the vehicle. Such an inflatable bag is normally installed inside a central part of a steering wheel for protecting the vehicle operator. To protect the vehicle occupant sitting next to the vehicle operator, an inflatable bag may be installed inside a part of the instrument panel opposing the vehicle occupant. To protect the vehicle occupants sitting in the rear seat, inflatable bags may be installed in the front seats or other suitable locations.

When a vehicle runs into an oncoming vehicle or a stationary object, a large deceleration acts upon the vehicle, and the vehicle occupant experiences an apparent force or an inertia force which pushes the vehicle occupant forward. A passive restraint system restrains the vehicle occupant from such a forward movement upon detecting a strong deceleration, and thereby prevents the vehicle occupant from hitting the windshield or other parts of the vehicle, and being thereby injured.

It is therefore essential for a passive restraint system using an inflatable air bag to be able to deploy the air bag in a short time period after detecting a large deceleration. For the air bag to be able to quickly deploy itself, the air bag must be free from leakage so that the gas for inflating the air bag may be fully utilized. Also, to fully utilize the energy of the gas for inflating the air bag, the air bag must inflate toward the vehicle occupant without excessively bulging in lateral directions.

Normally, an air bag is made of nylon fabric coated with rubber, and its open base end is connected to a housing for an inflator or a gas producing unit.

The air bag is normally folded, and received in an air bag housing. Upon detecting a strong deceleration, the inflator produces gas, and inflates the air bag. Because the production of the gas occurs in an almost explosive fashion so that the air bag may be deployed in a short time, gas pressure builds up extremely suddenly in the region near the open base end of the air bag, and an effective sealing arrangement is necessary in the open end of the air bag. Therefore, there has been a demand for a simple and economical structure which can firmly secure the open end of an air bag, and eliminate the possibility of gas leakage.

Because of the need to be stowed in a relatively small compartment provided inside an instrument panel or the like, an air bag system is desired to be as compact as possible. On the other hand, the housing for the air bag should not hinder the deployment of the air bag. Furthermore, if the air bag housing has an insufficient rigidity, when the air bag is inflated, the housing may be deformed, and may allow the air bag to be inflated laterally. This reduces the impetus of the air bag to be properly deployed, and is therefore undesirable. Conversely, if the housing is too rigid, it will present a rigid surface in front of a vehicle, occupant, and the capability of the area accommodating the air bag to absorb impact is reduced. This is not desirable because additional padding may be necessary to achieve a desired impact absorbing capability in this area.

The part of the instrument panel or the like in which an air bag system is installed is normally closed by a lid which can readily rupture when the air bag is deployed, and this lid may be mounted either on a housing accommodating the inflator for producing the gas and/or the air bag, or on the instrumental panel either directly or via a frame structure.

In the former case, there is some difficulty in aligning the lid with the opening provided in the instrument panel. In the latter case, the instrument panel is significantly damaged whenever the air bag is activated, and the repair subsequent to the deployment of the air bag is unacceptably costly.

BRIEF SUMMARY OF THE INVENTION

In view of such problems of the prior art, a primary object of the present invention is to provide a passive restraint system for a vehicle occupant using an air bag which is compact in size, and can smoothly deploy the air bag.

A second object of the present invention is to provide a passive restraint air bag system which is capable of absorbing impact.

A third object of the present invention is to provide a passive restraint air bag system which is easy to install.

A fourth object of the present invention is to provide a passive restraint air bag system which would not damage the instrument panel or other part of the vehicle body when it is deployed.

A fifth object of the present invention is to provide a passive restraint air bag system which is free from leakage even when a pressure build up in the air bag is extremely rapid.

According to the present invention, these and other objects can be accomplished by providing a passive restraint system for a vehicle occupant using an air bag that can be inflated upon detection of a deceleration exceeding a certain threshold level, comprising: an inflator housing containing an inflator for producing gas for inflating an air bag and having a first opening from which gas produced from the inflator may be expelled; an air bag housing attached to the inflator housing, and having a second opening disposed so as to be communicated with the first opening of the inflator housing when the air bag housing is attached to the inflator housing, and a third opening placed opposite to the second opening; and an air bag received in the air bag housing in a folded state, and adapted to be projected and deployed from the third opening of the air bag housing when the air bag is inflated by the gas, the air bag being provided with an open base end from which gas produced from the inflator may be introduced into the air bag to inflate the same, the base end being clamped between the inflator housing and the air bag housing when the air bag housing is attached to the inflator housing.

Because the base end of the air bag can be clamped between the two housings over a relatively large area, it is possible to avoid any concentration of stress in the base end of the air bag, and a favorable sealing capability and a high mechanical strength can be accomplished at the same time. Thus, the reliability of the air bag system can be improved. Also, the air bag system can be built as a highly compact unit.

The two housings can be arranged in a number of ways. For instance, a partition wall can be interposed between the inflator housing and the air bag housing, the partition wall being provided with at least one opening serving as a gas outlet for allowing gas produced from the inflator to be introduced into the air bag. Thus, the two housings can be assembled without being hampered by any poor accessibility. Alternatively, the partition wall may be integrally provided in the inflator housing, and the base end of the air bag may be interposed between sealing surfaces defined on the partition wall and an annular flange provided in the air bag housing. As yet another possibility, the inflator housing and the air bag housing may consist of an integrally formed common housing which is separated by the partition wall consisting of a separate member, the base end of the air bag being interposed between sealing surfaces defined on the partition wall and an inner surface of the common housing.

Typically, the inflator housing is securely attached to a fixed part of a vehicle body, and the third opening is placed opposite to an opening of a part of a vehicle body such as an instrument panel. The vehicle body opening is closed by a lid member which can rupture when the air bag is deployed, the lid member being engaged by the instrument panel by first engagement means allowing a lateral movement of the lid member relative to the vehicle body opening.

Thus, it is possible to properly position the lid member with respect to the vehicle body opening, and a favorable external appearance can be ensured. To accomplish this goal, the first engagement means may comprise a plurality of tongues depending from a reverse surface of the lid member, the tongues being each provided with a claw engaging an inner peripheral edge of the vehicle body opening.

According to a preferred embodiment of the present invention, the lid member is provided with a peripheral part overlapping an inner peripheral edge of the vehicle body opening from exterior. Thus, even when the air bag is deployed, and the lid member is ruptured, the surrounding part of the vehicle body typically consisting of an instrument panel would not be damaged. Preferably, the lid member is engaged by the air bag housing by second engagement means which allows slight movement of the lid member away from the vehicle body part. Thus, when the lid member ruptures, because the lid member is initially pushed by the inflated air bag a short distance away from the surface of the vehicle body, the peripheral edge of the lid member would not hit the surface of the vehicle body, and the possibility of damaging the vehicle body upon deployment of the air bag can be reduced even further.

The first engagement means may comprise a plurality of tongues depending from a reverse surface of the lid member, the tongues being each provided with a claw engaging an inner peripheral edge of the vehicle body opening. The second engagement means may comprise a hook member secured to the air bag housing, and a slot provided at least in one of the tongues or in a separately provided tongue depending from the lid member, and engaged by the hook member. Preferably, the hook member is provided with a stopper adapted to engage a free end of the tongue so as to limit an excessive inward displacement of the lid member into the vehicle body opening. Alternatively, it is also possible to join the lid member to the air bag housing with a belt passed around said inflator housing and said air bag housing and engaged to said lid member at two terminal ends thereof.

To ensure the air bag to be properly projected upon its deployment, the air bag housing preferably diverges from the second opening toward the third opening, and is provided with at least one folding line about which the air bag housing can readily flex relative to the inflator housing. The divergent shape of the air bag housing contributes to a favorable and rapid deployment of the air bag. Also, the capability of the air bag housing to flex is desirable because it allows the air bag system to absorb impact energy when hit for instance by a vehicle occupant. Additionally, if there is an error in the positioning of the air bag housing relative to the vehicle body, such a flexibility of the air bag housing is helpful in adjusting the position of the air bag housing relative to the vehicle body opening. An excessive flexibility in the air bag system is not desirable because it will allow lateral expansion of the air bag housing upon deployment of the air bag, and dissipates some of the energy of the gas for inflating the air bag. A favorable impact absorbing capability and a resistance to lateral expansion can be readily accomplished if part of the air bag housing surrounding the third opening is relatively reinforced so as to have a relatively high rigidity against lateral deformation.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
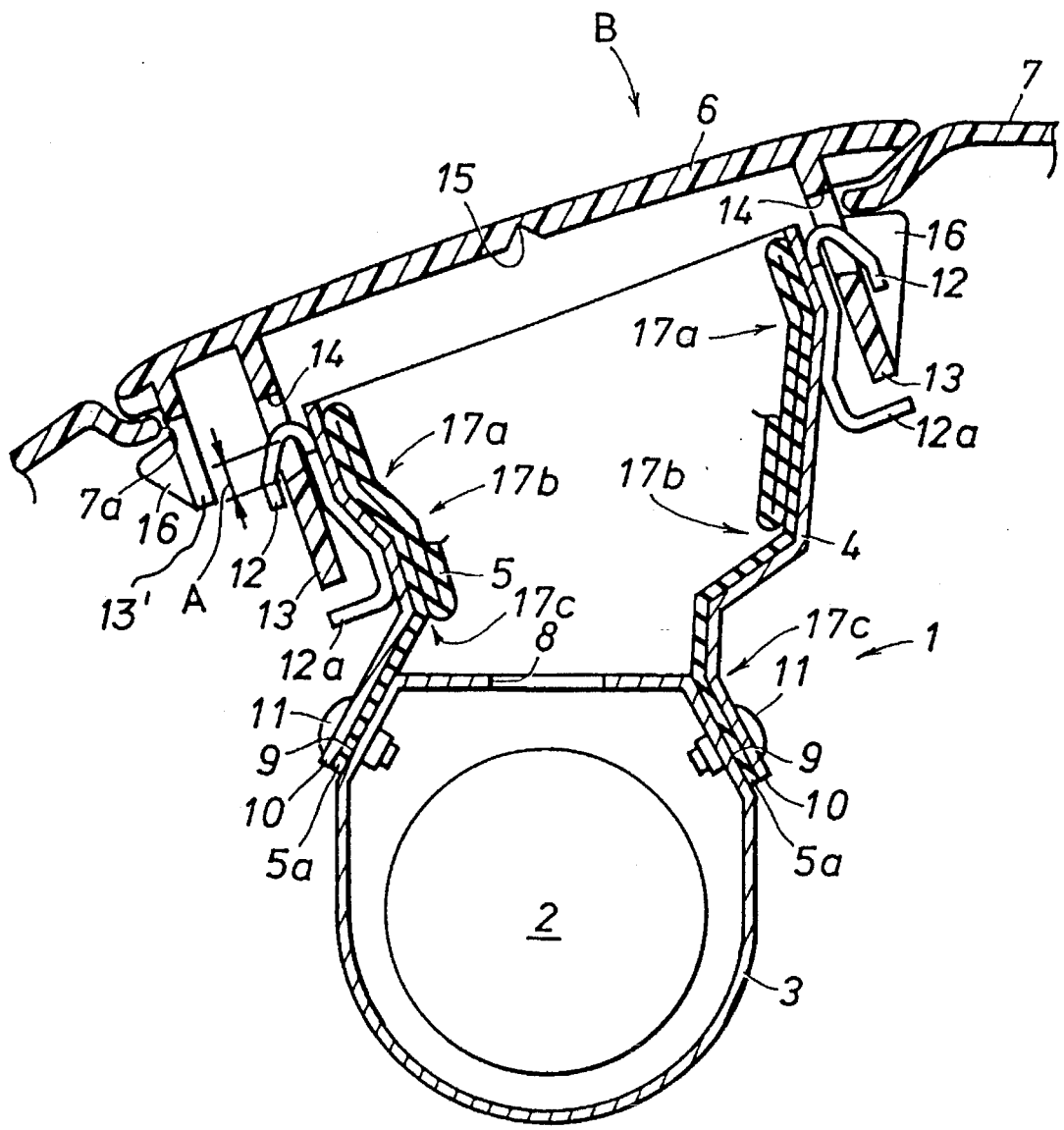
FIG. 1 is a sectional side view of a first embodiment of the passive restraint air bag system according to the present invention.
Figure 2:
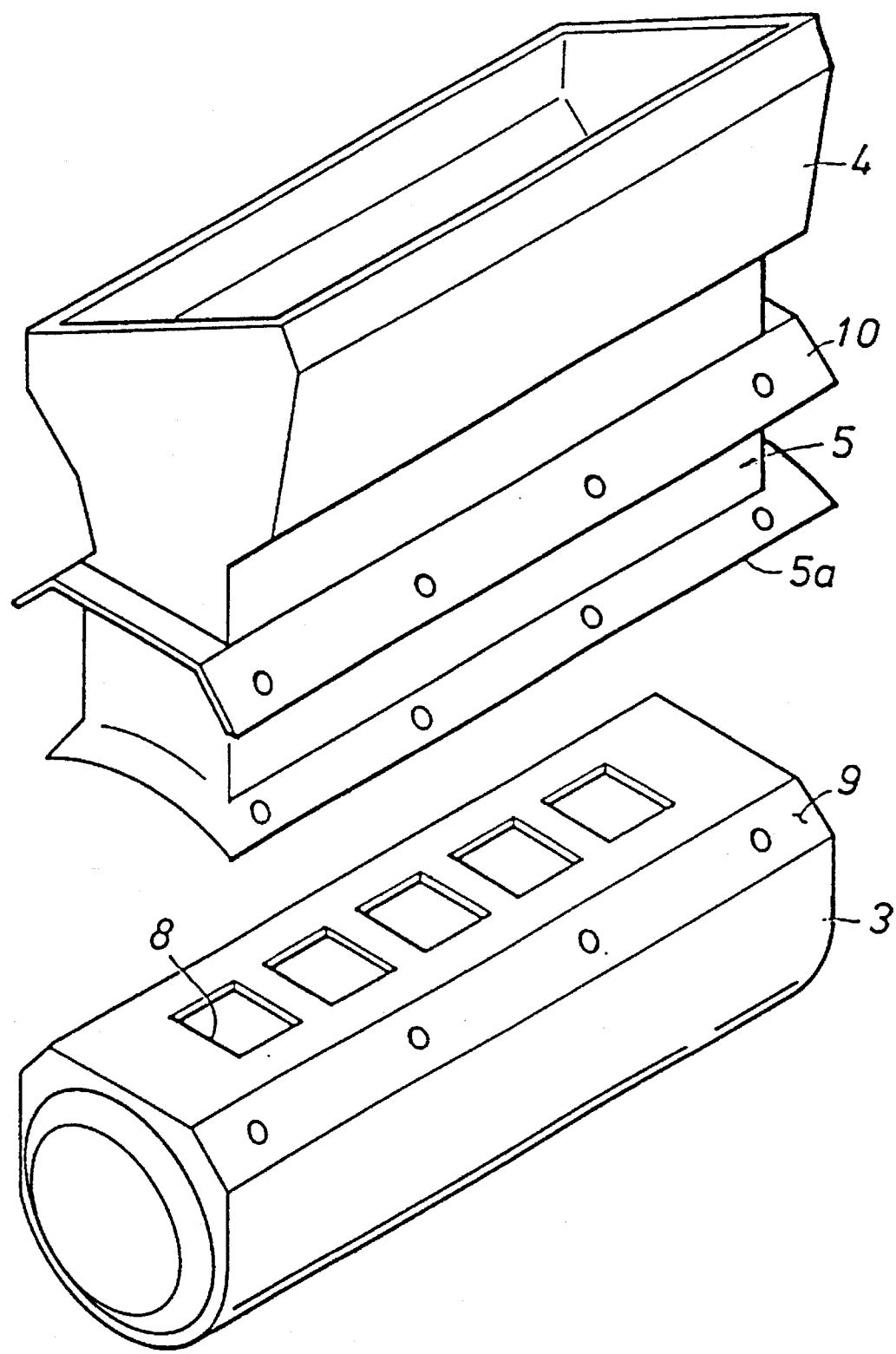
FIG. 2 is an exploded perspective view showing the housings for the inflator and the air bag of the first embodiment.
Figure 3:
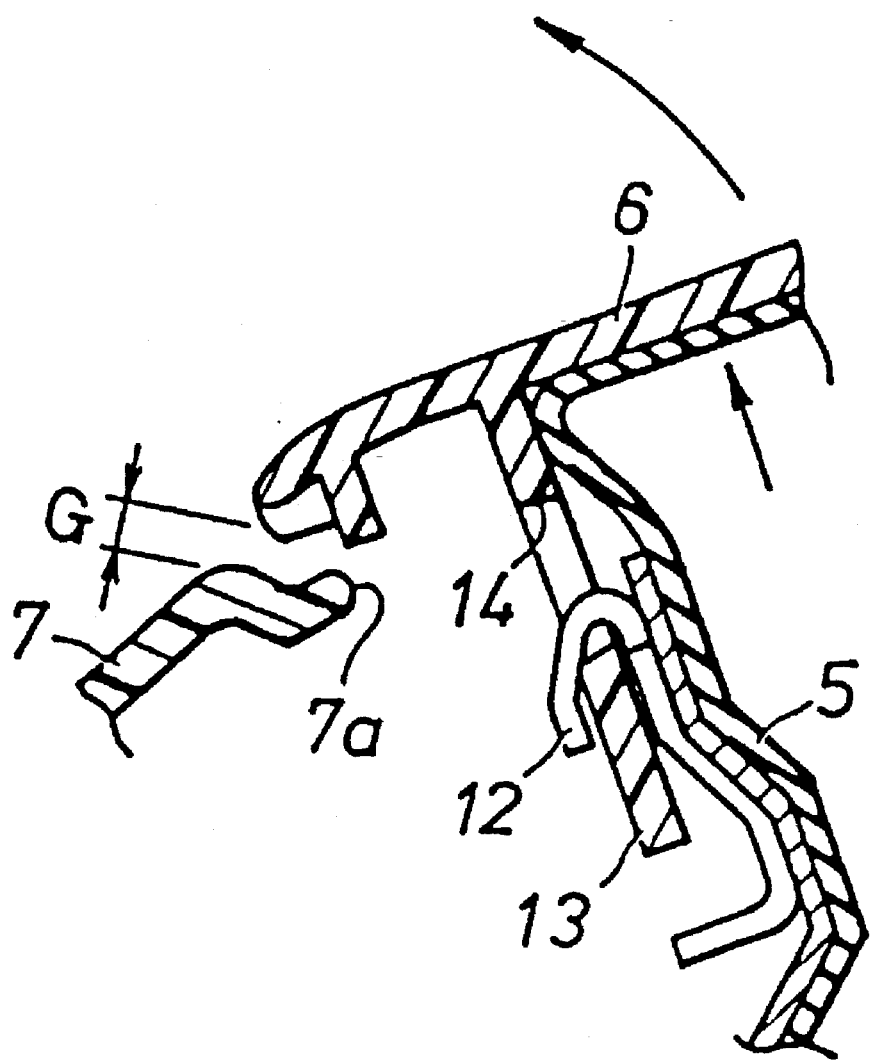
FIG. 3 is a fragmentary sectional view showing a part of FIG. 1 when the air bag is about to be deployed.

Referring to FIGS. 1 through 3 showing a first embodiment of the present invention, the air bag system 1 according to the present invention is provided with an inflator 2 for producing gas upon detecting a signal indicative of a large deceleration normally caused by a vehicle crash, a lower housing 3 for generally accommodating the inflator 2, an upper housing 4 connected to an upper end of the lower housing 3, an air bag 5 made of rubber-coated nylon fabric and received inside the upper housing 4 in a closely folded condition, and a lid 6 closing the open upper end of the upper housing 4. This air bag system 1 is adapted to be installed inside an opening 7a of an instrument panel 7 facing the vehicle occupant sitting next to the vehicle operator.

The air bag 5 can be rapidly inflated by igniting a gas generating agent received in the inflator 2 such as sodium nitride, and the produced gas is introduced into the air bag 5. The inflated air bag 5 will restrain the forward movement of the vehicle occupant. The details of such an air bag system is well known in the art, and reference should be made to other documents for more details.

The lower housing 3 has a cylindrical shape, and its two axial ends are closed. The lower housing 3 extends laterally, and receives the inflator 2 therein. The upper surface of the lower housing 3 is provided with a plurality of gas outlets 8 arranged along a central axial line of the lower housing 3 for expelling the gas produced from the inflator 2, and these gas outlets 8 are flanked by a pair of sealing surfaces 9 on either side. Thus, the sealing surfaces 9 diverge downward as seen from an axial end.

The upper housing 4 is rectangular in shape when viewed from above, and has an inverted trapezoidal shape when viewed from an axial end. The upper and lower ends of the upper housing 4 are both open. The lower end of the upper housing 4 is provided with flanges 10 which conform to the sealing surfaces 9 of the lower housing 3. The lower housing 3 and the upper housing 4 are integrally joined together by bolts and nuts, blind rivets or other suitable fastening means 11 with an open inlet end 5a of the air bag 5 closely interposed and clamped between the sealing surfaces 9 and the flanges 10.

A plurality of hook members 12 are secured to the front and rear surfaces of an upper end of the upper housing 4. The lid 6 is integrally provided with a plurality of elastic tongues 13 depend from the reverse surface of the lid 6 and arranged laterally in two rows near the front and rear edges of the lid 6, respectively, and a vertical slot 14 is provided in each of the elastic tongues 13. The elastic tongues 13 are arranged so that the hook members 12 may be engaged with the slots 14 of these elastic tongues 13. The lower end of each of the hook members 12 is bent laterally outward so as to define a stopper projection 12a for restricting the downward movement of the lid 6 beyond a certain limit by engaging the lower ends of the elastic tongues 13.

A lateral groove 15 is formed centrally in the inner surface of the lid 6 to provide a line of weakness, and a plurality of laterally projecting claws 16 are integrally provided along the front and rear edges of the lid 6 for engaging the inner surface of the front and rear edges of the opening 7a of the instrument panel 7 which is covered and closed by the lid 6. In this embodiment, the claws 16 provided along the front edge of the lid 6 are provided in the elastic tongues 13 provided with the slots 14, but the claws 16 provided along the rear edge of the lid 6 are provided in similar elastic tongues 13 which are however provided separately from the elastic tongues 13.

When installing the lid 6 on the air bag system 1 described above, a stiffener member (not shown in the drawings) attached to the interior of the instrument panel 7 is secured to a part of the air bag system 1 such as the lower housing 3 in advance, and the lid 6 is pushed into the opening 7a of the instrument panel 7 so as to cover it. Then, the elastic tongues 13 are resiliently deformed outwardly, and ride over the hook members 12. Once the hook members 12 are lined up with the slots 14, the elastic tongues 13 are resiliently restored to their original shape, and the hook members 12 are fitted into the slots 14. At the same time, the claws 16 are engaged with the inner peripheral edge of the opening 7a, and the position of the lid 6 is determined relative to the instrument panel 7. At this point, because the lid 6 can be moved within a range permitted by the play between the hook members 12 and the resilient tongues 13, and the size of the slots 14, the proper positioning of the lid 6 with respect to the opening 7a of the instrument panel 7 can be ensured.

The air bag 5 which is normally folded and received in the interior of the upper housing 4 breaks through the lid 6 and is instantaneously deployed into the passenger compartment when the inflator gas produced upon detecting a large deceleration is rapidly introduced into the air bag 5. Therefore, the open inlet end 5a of the air bag 5 which is interposed between the sealing surfaces 9 and the associated sealing surface of the flanges 10 are subjected to a large tensile force due to the gas pressure. However, according to the present invention, because the area of contact between the open inlet end 5a of the air bag 5 and the interface between the two housings 3 and 5 can be made sufficiently large, it is possible to avoid concentration of stress and to increase the strength of the structure securing the open inlet end 5a of the air bag 5 without excessively increasing the contact pressure. Furthermore, the possibility of gas leakage from this part can be minimized.

Because there is a gap A between the hook members 12 and the slots 14 of the elastic tongues 13, and the claws 16 can be easily disengaged from the edge of the opening 7a when lid 6 is pushed out, the lid 6 can be lifted from the upper surface of the instrument panel when the air bag 5 is inflated. It should be noted that the peripheral outer edge of the lid 6 overlaps the peripheral inner edge of the opening 7a from exterior. As a result, a gap G is produced between the inner edge of the opening 7a of the instrument panel 7 and the outer edge of the lid 6. Therefore, it is possible to avoid interference between the front and rear edges of the opening 7a of the instrument panel 7 and the outer edge of the lid 6 when the lid 6 is ruptured at the groove 15, and the air bag 5 is deployed. Thus, the instrument panel 7 itself is not subjected to any excessive force, and can safely remain intact even after deployment of the air bag.

In this embodiment, the upper housing 4 diverges upward as seen from an axial end thereof, and is provided with laterally extending fold lines 17a, 17b and 17c which define readily flexible regions.

Therefore, according to this embodiment, if an external force is applied to the lid 2 in the direction indicated by arrow B in FIG. 1, because the fold lines 17a through 17c allow the upper housing 4 to deform in its middle part or with respect to the lower housing 3, the upper housing 4 can be relatively easily tilted or otherwise deformed, and absorb energy when impact is applied to the air bag system in the direction indicated by arrow B. Thus, the lid and the surrounding region of the instrument panel are provided with a capability to absorb impact energy, and no extra padding would be required. Also, the diverging shape of the middle portion of the upper housing 4 contributes to the rapid deployment of the air bag 5.

Figure 4:
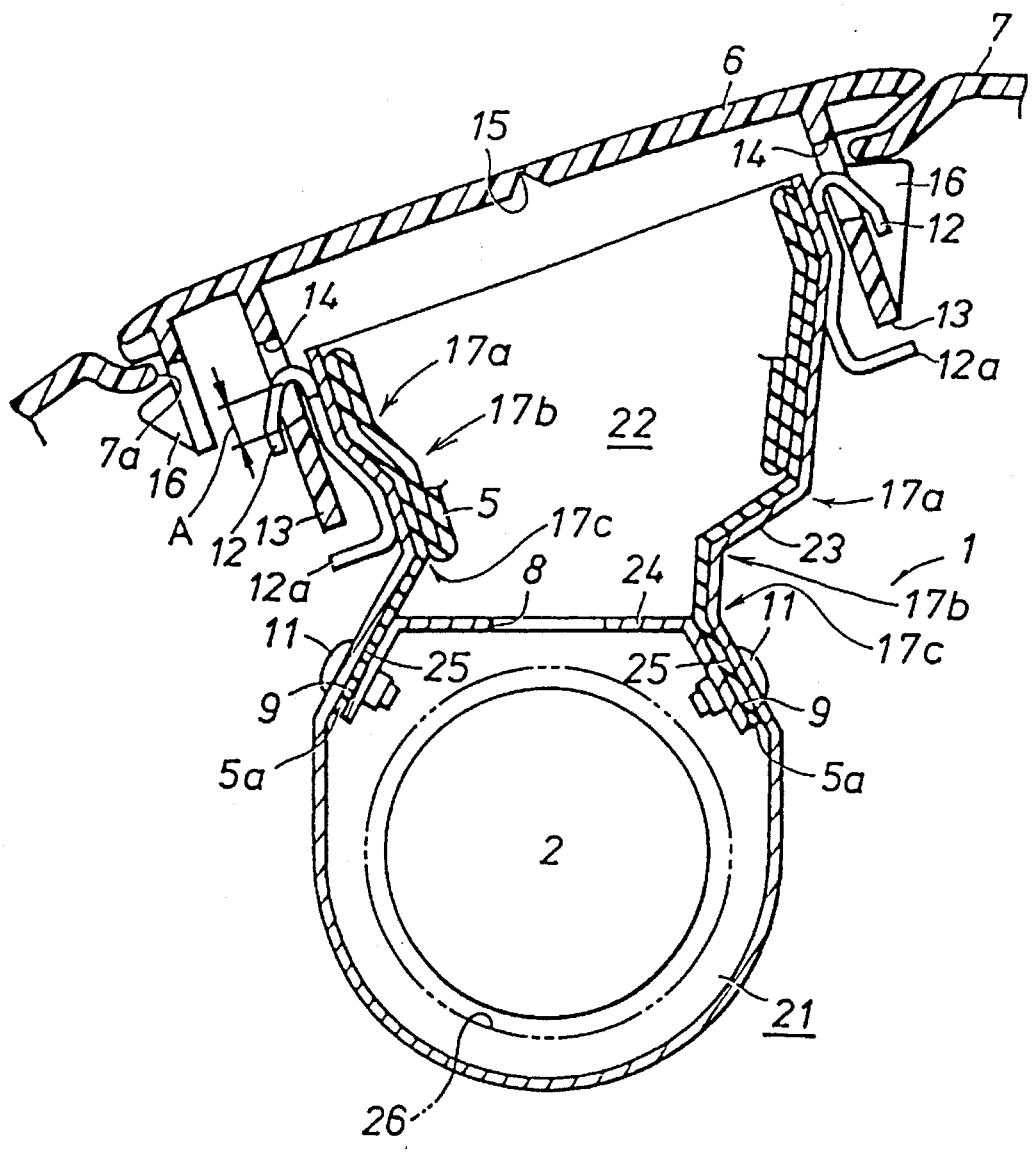
FIG. 4 is a sectional side view of a second embodiment of the passive restraint air bag system according to the present invention.
Figure 5:
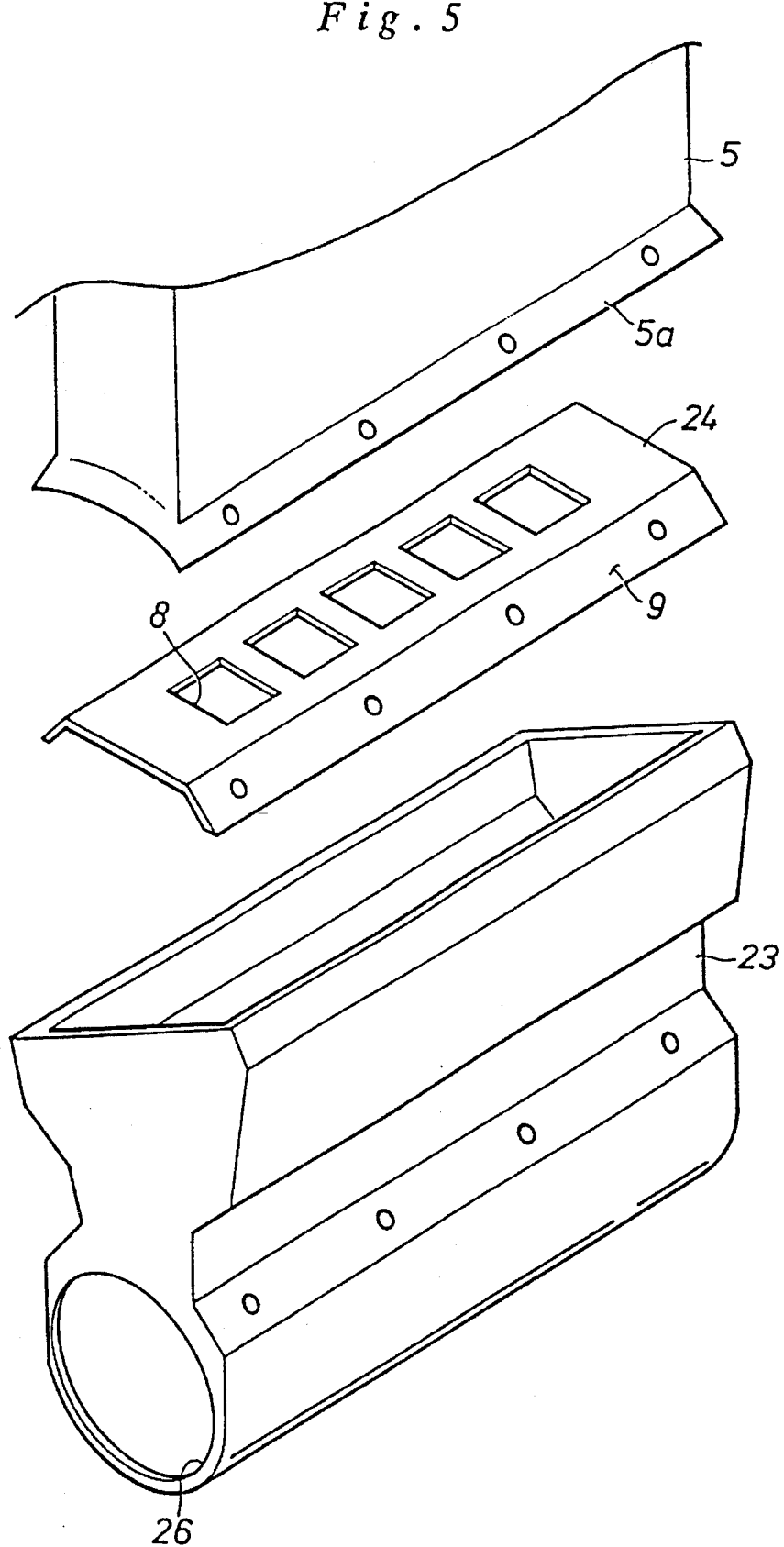
FIG. 5 is an exploded perspective view showing the housings for the inflator and the air bag of the second embodiment.

FIGS. 4 and 5 show a second embodiment of the present invention. In these drawings, the parts corresponding to those of the previous embodiments are denoted with like numerals.

In the second embodiment, the inflator housing 21 accommodating the inflator 2 and the air bag housing 22 accommodating the air bag 5 are combined as a substantially integral and common main housing 23, and a separating wall 24 consisting of a separate member from that of the main housing 23 is secured inside the main housing 23 so as to separate the interior of the main housing 23 between the inflator housing 21 and the air bag housing 22.

The separating wall 24 consists of a rectangular plate having its side edges bent downward along fold lines extending along the longitudinal direction, and is provided with a plurality, in this case five, of gas outlets 8 consisting of rectangular openings arranged centrally along its central longitudinal line. The separating wall 24 is provided with a pair of flat surfaces on its downwardly bent side edges which serve as sealing surfaces 9 each having an appropriate width similar to those provided on the upper surface of the lower housing 3 of the first embodiment.

The inflator housing 21 is provided with a substantially U-shaped cross section while the air bag housing 22 is provided with an inverted, substantially trapezoidal cross section. The upper end of the air bag housing 22 is open. A vertically middle part of the main housing 23 is somewhat made narrower, and is provided with sealing surfaces 25 on its inner surface which cooperate with the sealing surfaces 9 of the separating wall 24.

When assembling this air bag system 1, first of all, before installing an inflator 2 into the inflator housing 21, the separating wall 24 is introduced into the inflator housing 21 from the open upper end of the main housing 23. This can be accomplished by tilting the separating wall 24 until it is received in the inflator housing 21. The base end 5a of an air bag 5 is likewise placed into the open upper end of the main housing 24, and is placed between the sealing surfaces 9 and 25. Then, the separating wall 24 is secured to the main housing 23 with suitable fastening means 11 so as to securely clamp the base end 5a of an air bag 5 between the sealing surfaces 9 and 25. This can be accomplished by putting a hand into the inflator housing 21 from an access opening 26 provided on an axial end of the inflator housing 21.

The second embodiment may also be provided with hook members 12 and elastic tongues 13 similar to those of the previous embodiment, and the gap A which may be provided between the hook members 12 and the slots 14 of the elastic tongues 13 produces similar benefits.

Figure 6:
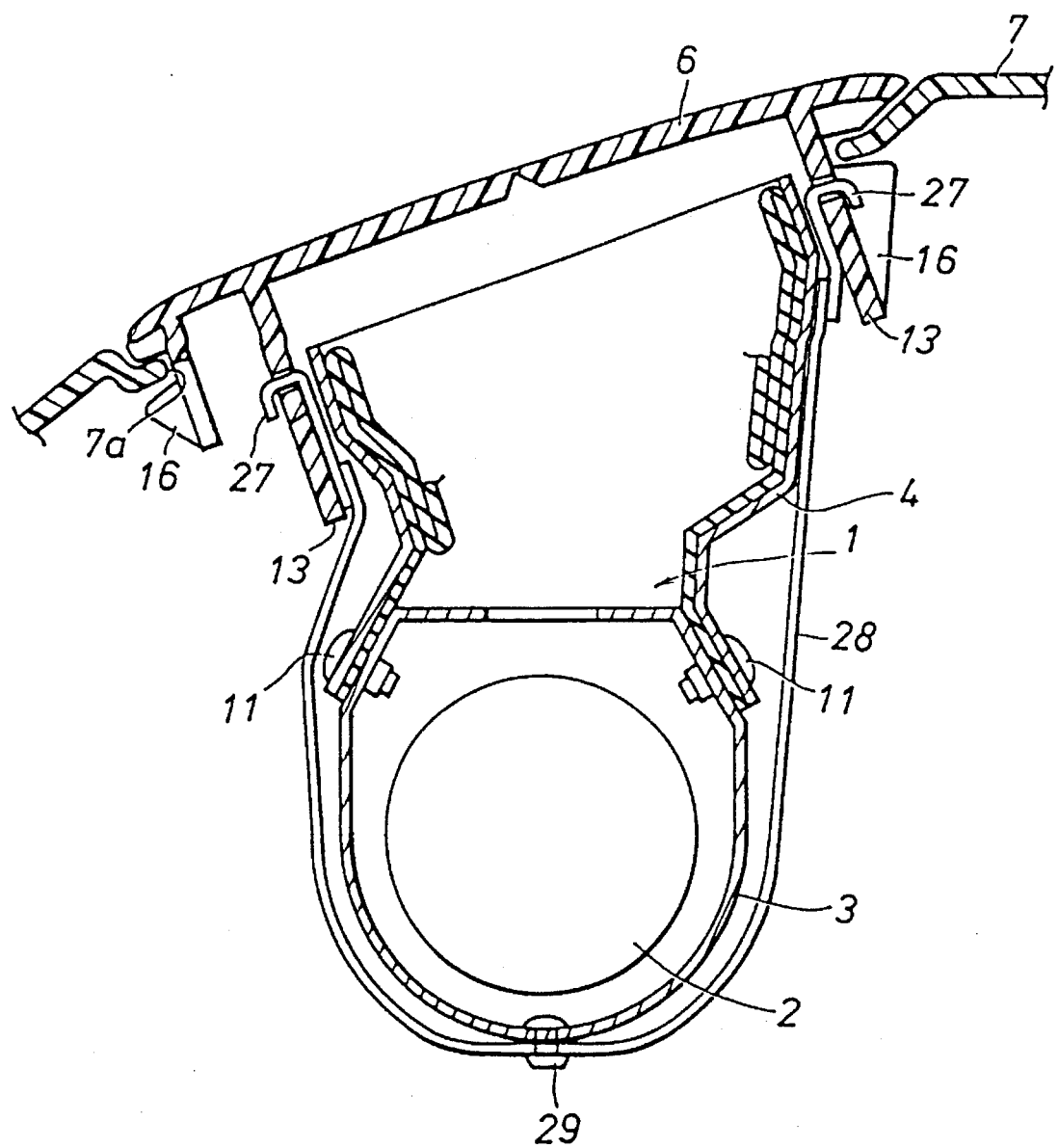
FIG. 6 is a sectional side view of a third embodiment of the passive restraint air bag system according to the present invention.

FIG. 6 shows a third embodiment of the present invention. According to this embodiment, the lid 6 is joined to the air bag system 1 by passing a pair of belts 28 around the upper housing 4 and the lower housing 3, and engaging the two ends 27 of each of the belts 28 with elastic tongues 13 integrally depending from the lid 6. The belts 28 are given with some slack, and are secured to the bottom surface of the lower housing 3 with rivets 29. The lower housing 3 is secured to a fixed member of the vehicle body although it is not shown in the drawing.

In this embodiment, the positioning of the lid 6 with respect to the opening 7a of the instrument panel 7 is accomplished by claws 16 integrally formed in the lid 6 and engaging the inner edge of the opening 7a of the instrument panel 7 in the same way as in the previous embodiments. Additionally, this embodiment allows the vertical positioning of the lid 6 with respect to the opening 7a of the instrument panel to be adjusted by changing the slack of the belts 28.

The belts 28 may be secured to the housings in different ways. For instance, the fastening means 11 joining the two housings 3 and 4 may also be used for joining the belts 22 to the housings. The belts 28 may also be secured to a fixed member of the vehicle body. Also, at least one end of each belt 28 may be insert molded with the lid 6 or otherwise fixedly secured to the lid 6.

According to these embodiments, the position of the lid can be easily adjusted along the surface of the instrument panel, and a favorable appearance can be ensured without any difficulty. Furthermore, the lid can be ruptured in a predictable way when the air bag is deployed, and a reliable operation of the air bag system is ensured.

Figure 7:
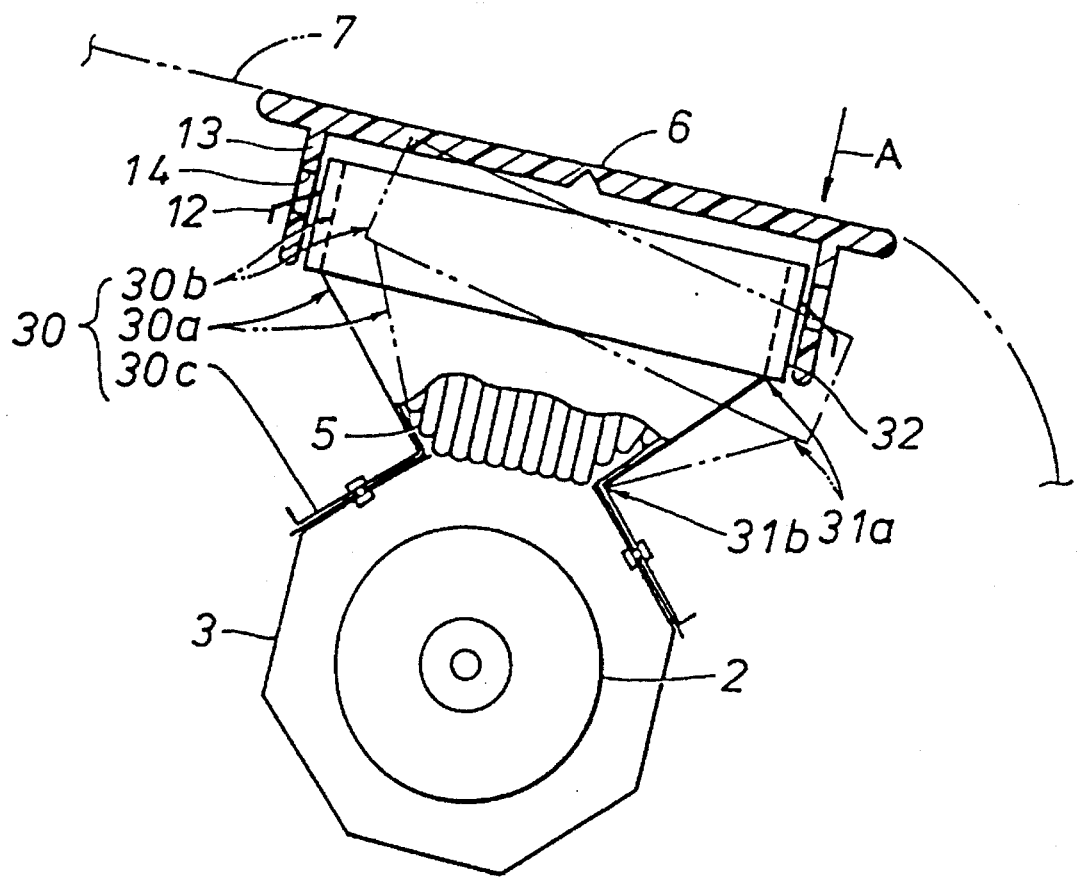
FIG. 7 is a simplified sectional side view of a fourth embodiment of the passive restraint air bag system according to the present invention.
Figure 8:
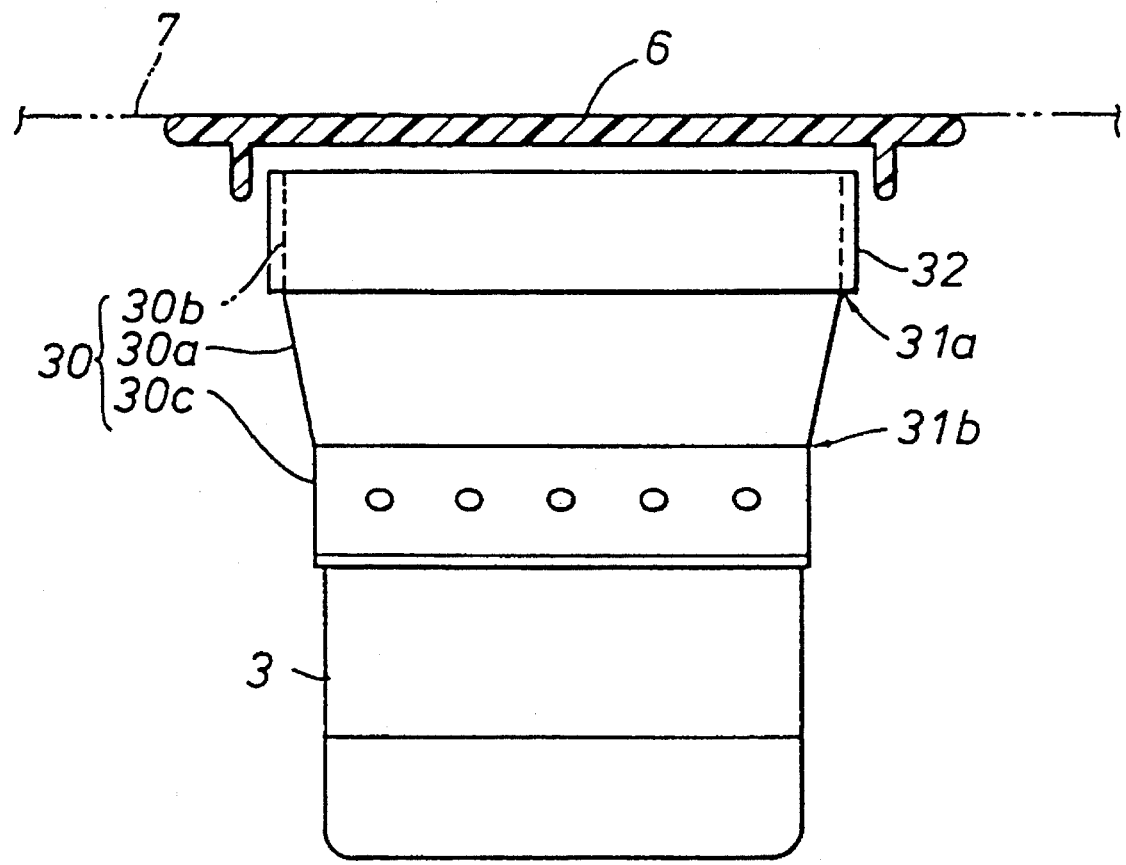
FIG. 8 is a simplified plan view showing the housings for the inflator and the air bag of the fourth embodiment.

FIGS. 7 and 8 show a fourth embodiment of the present invention, which is similar to the first embodiment, in a simplified fashion to clarify the features of this embodiment. In these drawings, the parts corresponding to those of the first embodiment are denoted with like numerals.

In this embodiment, the inflator 2 is received in an inflator housing 3, and an air bag housing 30 is attached to an upper end of the inflator housing 3, interposing the base end of the air bag 5 between the opposing surfaces of the two housings 3 and 30. The inflator housing 3 is substantially cylindrical in shape. The air bag housing 30 is rectangular in plan view, but generally diverges upward. It should be noted that the air bag housing 30 diverges upward as seen either from an axial end or from a lateral end (in other words, as seen either in FIG. 7 or FIG. 8).

More specifically, the air bag housing 30 comprises a middle portion 30a, a frame portion 30b connected to the upper end of the middle portion 30a, and a flange portion 30c connected to the lower end of the middle portion 30a and secured to the inflator housing 3. The base end of the air bag 5 is interposed between the flange portion 30c and the inflator housing 3. As seen from an axial end, the middle portion 30a extends obliquely or diverges from the flange portion 30c, and the frame portion 30b extends in parallel from an upper end of the middle portion 30a.

A plurality of hook members 12 are provided around the upper frame portion 30b, and engage a plurality of elastic tongues depending from the reverse surface of the lid 6 by way of slots 14 provided in these elastic tongues 13 to join the lid 6 to the upper frame portion 30b securely but so as to allow lateral adjustment of the lid 6 with respect to the instrument panel 7.

Thus, relatively flexible regions 31a and 31b are provided between the upper frame portion 30b and the middle portion 30a, and between the middle portion 30a and the lower flange portion 30c, respectively, while the upper frame portion 30b is reinforced by an annular reinforcement member 32 having a relatively high rigidity and closely surrounding the upper frame portion 30b.

According to this embodiment, if an external force is applied to the lid 2 in the direction indicated by arrow A in FIG. 7, because the flexible regions 31a and 31b allow the upper frame portion 30b and the middle portion 30a, respectively, relative to the fixed lower flange portion 30c. This tendency is further enhanced by the reinforcement of the upper frame portion 30b with the annular reinforcement member 32. Thus, the lid and the surrounding region of the instrument panel are provided with a capability to absorb impact and energy.

In spite of the capability to readily deform and absorb energy of impact, the upper frame portion 30b is provided with a sufficient rigidity to withstand pressure from the air bag as it is about to be deployed, and the gas produced from the inflator can be effectively used for rapidly forwarding the air bag in front of the vehicle occupant. The diverging shape of the middle portion 30a also contributes to the rapid deployment of the air bag.

Although the present invention has been described in terms of specific embodiments, it is possible to modify and alter details thereof without departing from the spirit of the present invention.

What we claim is:

1. A passive restraint system for a vehicle occupant using an air bag that can be inflated upon detection of a deceleration exceeding a certain threshold level, comprising:

an inflator housing containing an inflator for producing gas for inflating an air bag and having a first opening from which gas produced from said inflator may be expelled;

an air bag housing attached to said inflator housing, and having a second opening disposed so as to be communicated with said first opening of said inflator housing when said air bag housing is attached to said inflator housing, and a third opening placed opposite to said second opening;

an air bag received in said air bag housing in a folded state, and adapted to be projected and deployed from said third opening of said air bag housing when said air bag is inflated by said gas, said air bag being provided with an open base end from which gas produced from said inflator may be introduced into said air bag to inflate the same; and said third opening being placed in an opening provided in a part of a vehicle body part, and closed by a lid member which can rupture when said air bag is deployed, said lid member being engaged by said vehicle body part by first engagement means which guides said lid member into alignment with said opening of said vehicle body part, and by said air bag housing by second engagement means which secures said lid member in said opening of said vehicle body part and resiliently allows a slight lateral movement of said lid member with respect to said vehicle body part.

2. A passive restraint system according to claim 1, wherein said base end of said air bag is clamped between said inflator housing and said air bag housing when said air bag housing is attached to said inflator housing.

3. A passive restraint system according to claim 2, wherein a partition wall is interposed between said inflator housing and said air bag housing and provided with at least one opening serving as a gas outlet for allowing gas produced from said inflator to be introduced into said air bag.

4. A passive restraint system according to claim 3, wherein said partition wall is integrally provided in said inflator housing, and said base end of said air bag is interposed between sealing surfaces defined on said partition wall and an annular flange provided in said air bag housing.

5. A passive restraint system according to claim 4, wherein said partition wall is integrally molded with said inflator housing such that a single piece forms both said inflator housing and said partition wall.

6. A passive restraint system according to claim 3, wherein said inflator housing and said air bag housing consist of an integrally formed common housing which is separated by said partition wall consisting of a separate member, said base end of said air bag being interposed between sealing surfaces defined on said partition wall and an inner surface of said common housing.

7. A passive restraint system according to claim 6, wherein said integrally formed common housing is an integrally molded single piece.

8. A passive restraining system according to claim 1, wherein said lid member is provided with a peripheral part overlapping an inner peripheral edge of said vehicle body part, said second engagement means allowing slight movement of said lid member away from said vehicle body part.

9. A passive restraint system according to claim 8, wherein said first engagement means comprises a plurality of tongues depending from a reverse surface of said lid member, said tongues being each provided with a claw engaging an inner peripheral edge of said vehicle body part opening, and said second engagement means comprises a hook member secured to said air bag housing, and a slot provided at least in one of said tongues depending from said lid member, and engaged by said hook member.

10. A passive restraint system according to claim 8, wherein said second engagement means comprises a hook member secured to said air bag housing, and a tongue depending from a reverse surface of said lid member and having a slot engaged by said hook member.

11. A passive restraint system according to claim 10, wherein said hook member is provided with a stopper adapted to engage a free end of said tongue so as to limit an excessive inward displacement of said lid member into said vehicle body opening.

12. A passive restraint system according to claim 1, wherein said lid member is provided with a peripheral part overlapping an inner peripheral edge of said vehicle body part, and is engaged by said air bag housing by a belt passed around said inflator housing and said air bag housing and engaged to said lid member at two terminal ends thereof.

13. A passive restraint system according to claim 1, wherein said air bag housing diverges from said second opening toward said third opening, and is provided with at least one folding line about which said air bag housing can readily flex relative to said inflator housing.

14. A passive restraint system according to claim 13, wherein part of said air bag housing surrounding said third opening is relatively reinforced so as to have a relatively high rigidity against lateral deformation.

15. A passive restraint system according to claim 14, wherein said reinforced part is provided by an annular reinforcement portion.

16. A passive restraint system according to claim 1, wherein said vehicle body part comprises an instrument panel.

17. A passive restraint system according to claim 1, wherein said inflator housing is securely attached to a fixed part of said vehicle body part.

18. A passive restraint according to claim 1, wherein said first engagement means comprises a plurality of tongues depending from a reverse surface of said lid member, said tongues being each provided with a claw engaging an inner peripheral edge of said vehicle body part opening.

* * * * *